(12) United States Patent
Rummele-Werner et al.

(10) Patent No.: US 10,061,344 B2
(45) Date of Patent: Aug. 28, 2018

(54) SIGNAL GENERATOR FOR A MEASURING APPARATUS AND MEASURING APPARATUS FOR AUTOMATION TECHNOLOGY

(71) Applicant: Endress + Hauser GmbH + Co. KG, Maulburg (DE)

(72) Inventors: Stefan Rummele-Werner, Lorrach (DE); Dietmar Fruhauf, Lorrach (DE); Armin Wernet, Rheinfelden (DE); Kaj Uppenkamp, Wehr (DE); Gerd Bechtel, Steinen (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 215 days.

(21) Appl. No.: 14/901,163

(22) PCT Filed: Jun. 2, 2014

(86) PCT No.: PCT/EP2014/061353
§ 371 (c)(1),
(2) Date: Dec. 28, 2015

(87) PCT Pub. No.: WO2015/000649
PCT Pub. Date: Jan. 8, 2015

(65) Prior Publication Data
US 2016/0147251 A1    May 26, 2016

(30) Foreign Application Priority Data
Jul. 5, 2013    (DE) .......................... 10 2013 107 120

(51) Int. Cl.
*G06F 1/08*    (2006.01)
*G01F 23/26*   (2006.01)
*G06F 1/03*    (2006.01)

(52) U.S. Cl.
CPC .............. *G06F 1/08* (2013.01); *G01F 23/266* (2013.01); *G06F 1/0321* (2013.01); *G06F 1/0328* (2013.01)

(58) Field of Classification Search
None
See application file for complete search history.

(56) References Cited

U.S. PATENT DOCUMENTS

| | | | | |
|---|---|---|---|---|
| 4,438,530 A | * | 3/1984 | Steinberger | H04B 7/002 342/361 |
| 4,819,196 A | * | 4/1989 | Lilley | H03L 7/08 331/11 |

(Continued)

FOREIGN PATENT DOCUMENTS

| CN | 10229241 A1 | 1/2004 |
|---|---|---|
| CN | 101149630 A | 3/2008 |

(Continued)

OTHER PUBLICATIONS

German Search Report, German PTO, Munich, DE, dated Nov. 18, 2013.

(Continued)

*Primary Examiner* — Michael Lebentritt
(74) *Attorney, Agent, or Firm* — Bacon & Thomas, PLLC

(57) ABSTRACT

A signal generator for producing periodic signals for a measuring apparatus of automation technology. The signals have sequential, discrete signal frequencies, which lie within a predetermined frequency range. A control- and/or computing unit, a clock signal producer are provided, wherein the clock signal producer provides a constant sampling frequency, which is greater than the maximum discrete signal frequency in the predetermined frequency range. A memory unit is provided, in which for each of the discrete signal frequencies the amplitude values of the corresponding periodic signals are stored or storable as a function of the (Continued)

sampling frequency. The control- and/or computing unit reads out the stored or storable amplitude values of the discrete frequencies successively with the sampling frequency of the clock from the memory unit and produces the periodic signals, or forwards for producing. A static filter unit, is also provided with a limit frequency, which lies above the maximum signal frequency and which removes frequency fractions caused by the sampling.

12 Claims, 2 Drawing Sheets

(56) References Cited

U.S. PATENT DOCUMENTS

| | | | | |
|---|---|---|---|---|
| 5,062,492 | A * | 11/1991 | Inoue | G01G 3/1414 177/185 |
| 6,356,124 | B1 | 3/2002 | Schoch | |
| 6,934,731 | B1 * | 8/2005 | Katznelson | H03L 7/16 708/270 |
| 7,821,312 | B1 * | 10/2010 | Zheng | H03K 19/1733 327/145 |
| 7,946,148 | B2 | 5/2011 | Getman | |
| 8,955,377 | B2 | 2/2015 | Hortenbach | |
| 9,018,996 | B1 * | 4/2015 | Zarei | H04B 1/7176 327/115 |
| 2004/0264547 | A1 | 12/2004 | Robinson | |
| 2005/0135524 | A1 | 6/2005 | Messier | |
| 2006/0038601 | A1 * | 2/2006 | Giguere | G06F 1/06 327/291 |
| 2007/0299895 | A1 | 12/2007 | Johnson | |
| 2008/0005213 | A1 | 1/2008 | Holtzman | |
| 2013/0298667 | A1 | 11/2013 | Bechtel | |
| 2016/0147251 | A1 | 5/2016 | Rummele-Werner | |

FOREIGN PATENT DOCUMENTS

| | | |
|---|---|---|
| CN | 201716078 U | 1/2011 |
| CN | 1024560089 A | 5/2012 |
| DE | 3212434 C2 | 10/1983 |
| GB | 2117910 A | 10/1983 |
| WO | 2006034959 A2 | 4/2006 |
| WO | 2010139508 A1 | 12/2010 |
| WO | 2012100873 A1 | 8/2012 |
| WO | 2015000649 A1 | 1/2015 |

OTHER PUBLICATIONS

International Search Report, EPO, The Netherlands, dated Sep. 26, 2014.
English Translation of the International Preliminary Report on Patentability, WIPO, Geneva, CH, dated Jan. 21, 2016.
"Direct Digital Synthesis" Wikipedia, Die Freie Enzyklopadie. Bearbeitungsstand:Apr. 11, 2012, 18:19. archiviert durch URL: https://web.archive.org/web/20120528071015/http://de.wikipedia.org/wiki/Direct_Digital_Synthesis am May 28, 2012.
Matic, V. et. al.: Comparison of Digital Signal Processing Methods for Sine Wave Signal Generation:, Telecommunications Symposium, 1998. ITS '98 Proceedings, SBT/IEEE International, Aug. 1998, S. 290-295.
Sandler, H. M., Sedra, A.S.: Sine-Wave Generation Using a High-order Lowpass Switched-Capacitor Filter: Electronics Letters, vol. 22, May 6, 1986, Issue: 12, S. 635-636.—ISSN 0013-5194.

* cited by examiner

SIGNAL GENERATOR FOR A MEASURING APPARATUS AND MEASURING APPARATUS FOR AUTOMATION TECHNOLOGY

TECHNICAL FIELD

The invention relates to a signal generator for producing periodic signals for a measuring apparatus and to a measuring apparatus, in which the signal generator of the invention is applied. Preferably, the signal generator is used in a capacitive measuring apparatus. It can, however, also be applied in a vibronic measuring apparatus. Preferred field of application of the measuring apparatuses is automation technology.

BACKGROUND DISCUSSION

Frequently used for fill level- or limit level measurement in liquid media are measuring devices based on the capacitive measuring principle. Besides fill level, respectively limit-level, such measuring devices can also be used for determining and/or monitoring electrical conductivity and/or permittivity of a medium. For this, the fill level must remain unchanged. Furthermore, capacitive measuring devices can detect accretion formation on measuring apparatus components in contact with the medium.

Capacitive measuring devices comprise a measuring probe having, as a rule, a rod-shaped sensor electrode and, in given cases, a guard electrode for improving the accuracy of measurement in the case of accretion formation on the probe. The fill level of the medium is ascertained from the capacitance of the capacitor formed by the probe electrode and the container wall or a second electrode, wherein an alternating voltage is placed on the probe electrode. Depending on conductivity of the medium, the medium and/or the probe insulation forms the dielectric of the capacitor. The guard electrode lies at the same potential as the probe electrode and surrounds the probe electrode at least sectionally coaxially. A probe with guard is described, for example, in German patent, DE 3212434 C2, while a probe without guard is described in published international application, WO 2006/034959 A2. Capacitive probes for continuous fill level- or limit level determination are produced and sold by the applicant in different embodiments and with different probe lengths, for example, under the mark, LIQUICAP.

In the case of capacitive probes, the following dilemma presents itself: In order to prevent resonance effects, which disturb the measuring, it is advantageous to select the signal frequency of the alternating voltage placed on the measuring probe smaller, the longer the probe is. Higher signal frequencies have, however, the advantage that their sensitivity to accretion formation is less than at lower signal frequencies.

In order to provide an electronics unit compatible for probes of any length, consequently, in the case of known capacitive measuring devices, a signal frequency is used, often also referred to as the measuring frequency, which seems suitable for all probe lengths. Therefore, especially the signal frequency in the case of shorter probes lies below the signal frequency optimal for these shorter probes.

A further problem arises, when the medium has a conductivity, which lies in a transitional region dependent on the permittivity (dielectric conductivity) or independent of the permittivity. The fill level, respectively limit-level, is in this transitional region not reliably determinable by means of a capacitive measuring device. As a result, capacitive fill level measurement is not applicable in the case of such a medium.

Known from published international application, WO 2012/100 873 A1 is an apparatus for capacitively determining and/or monitoring the fill level of a medium in a container. This apparatus provides a solution for the above related problems. The known capacitive measuring device includes a probe unit having at least one probe electrode and an electronics unit. The electronics unit supplies at least the probe electrode with an electrical, transmission signal. Then, the electronics unit receives the electrical response signal from the probe unit and evaluates it. Especially, the probe electrode is successively supplied with measurement signals, which comprise sequential, discrete signal frequencies of a defined frequency range. Based on a frequency sweep, the electronics unit ascertains—as a function of the current application parameters in the process—the optimal signal frequency, respectively measuring frequency. The application parameters include, for example, probe length, possible accretion formation on the probe, character of the medium, etc. Then, the electronics unit determines from the response signal to the measurement signal with the optimal signal frequency the fill level, the limit-level or other physical parameter of the medium.

Commercially obtainable capacitive measuring devices have never had a frequency sweep capability. The known "static" measuring devices use for producing the basic signal a rectangular signal produced by a timer of the microcontroller. Using a higher order, lowpass filter, the harmonic waves of the rectangular signal are so strongly attenuated that there appears on the output of the low pass filter a sine signal, which is sent to the measuring probe via a driver stage. Measured are the amplitude and the phase of the response signal, thus of the alternating current, which flows through the measuring probe. This known variant is usually operated with a signal frequency between 30 kHz and 5 MHz.

Furthermore, Endress+Hauser sells capacitive measuring devices, which use a quartz oscillator as sine generator. In such case, the oscillation frequency of an oscillatory circuit is determined and held stable by the eigenfrequency of the quartz, respectively a multiple thereof. In the per thousand range, this frequency can be changed via a tuning capacitor; it is, however, not possible to change the oscillation frequency over an extended frequency range.

Another variant, which is applied in current measuring devices of Endress+Hauser, is based on an ASIC. For evaluating the sensor, only a few different frequencies in a limited frequency range can be selected, which, however, are not changeable during runtime.

Known from published international application, WO 29010/0139 508 A1 is a method for determining or monitoring with an oscillatable unit a predetermined fill level, a phase boundary or the density of a medium in a container. By means of a frequency sweep, the oscillatable unit is excited to execute oscillations within a predeterminable frequency range in the working range of the oscillatable unit successively with discrete exciter frequencies following one after the other, wherein the corresponding oscillations of the oscillatable unit are received in the form of received signals. Via the frequency sweep, that exciter frequency is ascertained, at which the oscillatable unit oscillates with an oscillation frequency, which has a predetermined phase shift between the transmission signal and the received signal, and wherein the transmitting/receiving unit (S/E) excites the oscillatable unit with the ascertained signal-, respectively oscillation frequency, to execute oscillations or wherein the next frequency sweep is started. Vibronic sensors, which can be operated with the above described method, are manufactured and sold by Endress+Hauser under the marks, LIQUIPHANT and SOLIPHANT. The signal generator of the invention can likewise be used in vibronic sensors.

For implementing dynamic signal generators, switched capacitor filters (also known as SC filters) can be used. In such case, harmonic waves are filtered from a rectangular signal to produce a sine signal, whose signal frequency is set via the clock source: If the clocking frequency changes, the signal frequency and the transfer function of the filter change. In order to suppress the aliasing effect at different signal frequencies, the limit frequency of the analog lowpass filter at the output of the signal generator must be changed further. Preferably, this occurs using a digital potentiometer. The advantage of this known signal generator is that with few components a sine signal with little harmonic distortion and variable frequency can be provided. The disadvantages of the known solution include that a variable clock signal producer is required. Necessary for operating the SC filter are clocking frequencies, which are much higher than the signal frequency. Corresponding solutions require relatively much energy. The factor lies in a range from 50 to 100 (compare e.g. Sandler, H. M., Sedra, A. S.: Sine wave generation using a high-order lowpass switched-capacitor filter. IEEE. April 1986).

SUMMARY OF THE INVENTION

An object of the invention is to provide a cost effective dynamic signal generator and a measuring device of automation technology, in the case of which the cost effective dynamic signal generator is applied.

The object is achieved relative to the signal generator by a signal generator for producing periodic signals, wherein the signals have sequential, discrete signal frequencies, which lie within a predetermined frequency range, comprising: a control- and/or computing unit, a clock signal producer, wherein the clock signal producer provides a constant sampling frequency, which is greater than the maximum discrete signal frequency in the predetermined frequency range, a memory unit, in which for each of the discrete signal frequencies the amplitude values of the corresponding periodic signals are stored or storable as a function of the sampling frequency, wherein the control- and/or computing unit reads out the stored or storable amplitude values of the discrete signal frequencies successively with the sampling frequency of the clock from the memory unit and produces the periodic signals (internal DAC) or forwards for producing (external DAC), and a static filter unit with a limit frequency, which lies above the maximum signal frequency and which removes frequency fractions caused by the sampling.

The periodic signals can be, in principle, sinusoidal signals, or triangular- or rectangular signals. In the case of capacitive measuring devices, usually sinusoidal signals are used. The clock signal producer can be in a as a separate unit or part of the control- and/or computing unit. The control- and/or computing unit can be, for example, a microprocessor, a microcontroller, a DSP and/or preferably an FPGA. Likewise, a CPLD or an ASIC can be applied.

The object is also achieved relative to a measuring device for capacitive determining and/or monitoring of the fill level or of the limit level of a medium in a container or another physical parameter by: A capacitive measuring device comprising a probe unit having at least one probe electrode and an electronics unit, which supplies the at least one probe electrode with an electrical measurement signal and receives and evaluates an electrical response signal from the probe unit, wherein the electronics unit supplies the at least one probe electrode at least at times with a measurement signal, which has a number of sequential, discrete signal frequencies lying within a predeterminable frequency range, wherein the discrete signal frequencies are produced by a signal generator associated with the electronics unit. This signal generator corresponds to the above described signal generator or its variants still to be described below. The electronics unit ascertains based on the sequential, discrete signal frequencies a signal frequency optimal for the current application parameters and determines based on the response signal belonging to the optimal signal frequency the fill level or the limit-level of the medium in the container or another physical process variable.

Another solution of the object as regards a vibronic sensor for determining or monitoring a predetermined fill level, a phase boundary or the density of a medium in a container with an oscillatable unit is as follows: The oscillatable unit is placed at the height of the predetermined fill level for monitoring such limit level; in the other mentioned cases, the oscillatable unit penetrates, e.g. continuously or at times, into the medium. The oscillatable unit is excited by means of a control unit via a frequency sweep within a predeterminable frequency range in the working range of the oscillatable unit successively with sequential, discrete signal-, respectively exciter, frequencies to execute oscillations, wherein the corresponding oscillations of the oscillatable unit are received in the form of received signals. Via the frequency sweep, that signal-, respectively exciter, frequency is ascertained, the case of which the oscillatable unit oscillates with an oscillation frequency, which has a predetermined phase shift between the transmission signal and the received signal. Then, the transmitting/receiving unit drives the oscillatable unit with the ascertained oscillation frequency. Also here, the frequency sweep is performed via the dynamic signal generator of the invention. The predetermined phase difference depends on the parameter respectively to be ascertained.

The dynamic signal generator of the invention, respectively the capacitive or vibronic measuring device of the invention, which uses the dynamic signal generator, has the following advantages compared with the known solutions:

The signal generator of the invention, respectively the capacitive or vibronic measuring device of the invention, cover the total frequency range required for the capacitive or vibronic measuring. This frequency range includes in the case of a capacitive measuring device at least the region from 50 kHz to 5 MHz. Preferably, the sampling frequency lies at 20 MHz. The above mentioned numbers are by way of example.

In automation technology, measurements often occur in explosion-endangered regions. In such case, the 4-20 mA standard is specified, so that the energy provided for a measuring device is limited. The signal generator of the invention, respectively the capacitive measuring device of the invention, can be operated with this small amount of energy. Thus, a power consumption of the electronic part of only a few mW can be achieved.

Since in the case of the solution of the invention a static filter is applied, no variable, relatively expensive and also defect susceptible components, such as e.g. digital potentiometers, need to be used. Also absent is an adjustment of filter coefficients for the respectively set, discrete signal frequency, which would be absolutely necessary in the case of application of an adaptable filter. As a result of the application of a static filter, the signal generator is simple, robust and cost effective. Added to this is the fact that in the case of currently buyable digital potentiometers the frequency range required for capacitive measurements technology is too small. The implementing of a filter suitable for capacitive measurements technology would require a great technical effort.

Since the optimal signal frequency for the current application is determined via a frequency sweep, the accuracy of measurement of the capacitive or vibronic measuring device is quite good.

An advantageous embodiment of the signal generator of the invention provides that in the memory unit for each of the discrete signal frequencies the amplitude values of the corresponding periodic signal are stored or storable as a function of the sampling frequency in the form of at least one search table, a so-called lookup table.

A simple method of producing a periodic signal by a digital component involves the application of a look-up table (LUT), respectively a search table. In the case of this method of signal generating, the individual amplitude values of the desired signal curve are either earlier sampled or calculated and then stored sequentially in a ring buffer, the LUT, (→control unit) or calculated by the system and then stored in the LUT (→control- and computing unit). Then, a counter with a predetermined clocking frequency passes through the address range of the ring buffer and the individual amplitude values of the signal are read-out and output via a digital-analog converter DAC. There are a number of variants for this method. Preferably, the memory unit uses in connection with the solution of the invention an integer delta implementation.

An integer delta implementation means that the amplitude values of a periodic signal for one period are stored at equidistant time intervals in the memory and then sequentially read-out.

The solution of the invention uses these methods of storing and subsequent read out. However, the amplitude values for different signal frequencies can be statically earlier determined and stored in a number of storing/memory ranges, or the amplitude values can be dynamically ascertained for each signal frequency and then stored in a memory.

Especially in the case of the integer delta implementation, one period of an e.g. sinusoidal signal is sampled or calculated at equidistant intervals in the range $0 \ldots 2\pi$. The sine signal is then achieved by incrementing the memory address with constant clocking rate. Used, in such case, as address register is a counter, which selects the individual rows of the LUT. The stored value is then output via a DAC. Since the counter in the case of an overflow simply begins at 0 again, a continuous signal is obtained. The signal frequency can, in such case, be selected, on the one hand, via the clocking frequency and, on the other hand, via the number of support points per period Another method for producing periodic signals, especially of cosine- and sinusoidal oscillations, involves iterative algorithms, e.g. the CORDIC-algorithm, wherein CORDIC is the acronym for COordinate Rotation Digital Computing.

The CORDIC algorithm is an interative method for calculating the amplitude values of sine- or cosine shaped signals in digital computers. For this, a predetermined rotational angle on the unit circle is approximated iteratively with the assistance of angular sections—without application of a multiplier, which saves resources, since multiplying operations and the processing of trigonometric functions are usually very resource intensive. By means of the CORDIC algorithm, the amplitude values of the signals can be calculated with little calculative effort during runtime. The output frequency is, in such case, freely selectable. However, because of the iterative way in which it works, a clocking frequency much higher than the signal frequency to be output is required. A CORDIC-algorithm can be implemented simply in an FPGA (=field programmable gate array) or in a gate array chip.

Alternatively, also recursive algorithms can be used for producing periodic signals. Recursive algorithms are used, for example, as digital filters and are especially known as IIR filters. The advantage of this method of signal production lies in the small memory capacity required for the signal production. For calculating the oscillation, for example, in a DSP, a number of cycles are required, however. The computing unit, which is used for calculating the amplitude values, must thus be clocked with a frequency, which is a multiple higher than the frequency of the produced signal. Other information concerning look-up tables and recursive algorithms can be found in IEEE. August 1998, Matic, Vladimir; Marinkovic-Nedeliclu, Verica; Tadic, Vladimir: "Comparison of digital signal processing methods for sine wave signal generation".

Preferably, embodiments of the dynamically adaptable signal generator of the invention and the capacitive or vibronic measuring device of the invention, in which the signal generator is implemented, are characterized by features including that a combination of at least one look-up table and a computing algorithm, especially the CORDIC algorithm, is used. By means of the computing algorithm, the amplitude values can be calculated at runtime and then stored in the LUT. This reduces the required memory. Look-up tables represent the simplest method for producing periodic signals. By means of a dynamically produced search table, the amplitude values for each signal frequency of the signals are newly calculated. After a complete pass through the search table, the start address is always zero. Thus, all signal frequencies can be produced, which correspond to the quotient of the clocking frequency and a whole number. Thus, a large number of producible signal frequencies results, for which the amplitudes are constant and stable to a high degree. By storing the calculated values in the search table, a relatively low clocking frequency can be used.

In a preferred embodiment of the solution of the invention, at least two search tables, respectively look-up tables, are provided, wherein via the first search table the output of the sampling points of a first discrete signal frequency occurs, while in the second search table the calculating and storing of the sampling points for a second discrete signal frequency occur in parallel.

An advantageous embodiment in connection with the invention is when the control/computing unit varies or sets the amplitude values of the periodic output signal produced by the signal generator by adapting of the algorithm, and/or wherein the control unit varies or sets the stored amplitude values in their size by a binary shifting operation of an output register.

Moreover, it is provided that the control- and/or computing unit corrects the amplitude values of the periodic output signal produced by the signal generator in such a manner that amplitude changes as a result of a frequency dependent attenuation are at least approximately compensated by the static filter unit or by other disturbance effects. The other disturbance effects especially concern temperature effects.

In connection with the signal generator of the invention and the capacitive or vibronic measuring device of the invention, it is provided that at least some components of the control/computing unit, respectively the electronics unit, are implemented in an FPGA. Especially implemented in the FPGA are the components for producing the at least one search table. With this variant, more discrete signal frequencies can be generated in the predetermined frequency range with guaranteed stable amplitude. Thus, a power optimized and cost effective solution results. Additionally, the high flexibility of the FPGA offers many interesting options—especially also as regards evaluation of the response signals of the capacitive measuring device.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
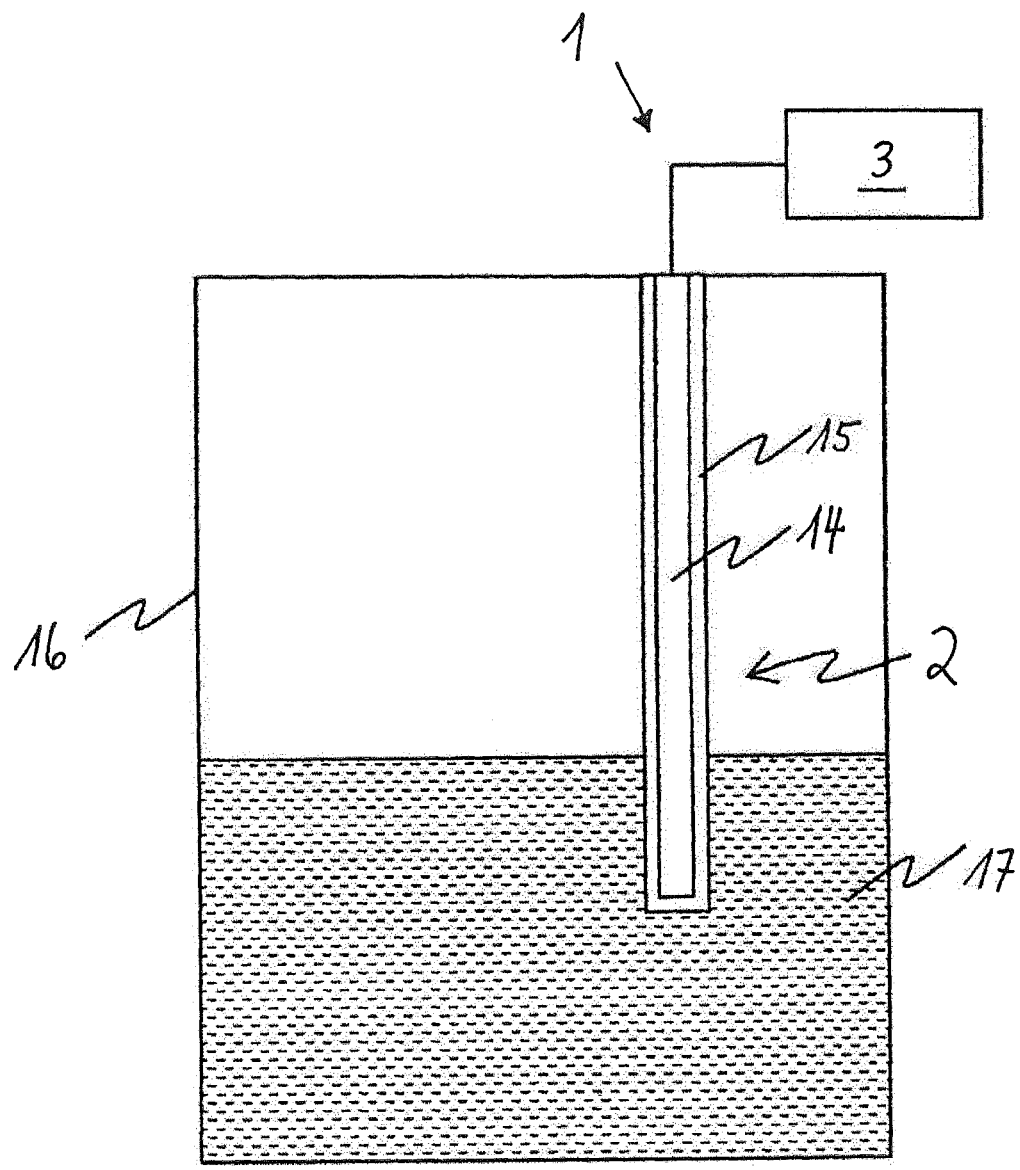
FIG. 1 is a schematic representation of a capacitive fill-level measuring device, in which the signal generator of the invention is implemented.

FIG. 1 shows an apparatus for capacitive determining at least of the fill level of a medium 17 in a container 16. A signal generator 5 of the invention is used in the apparatus. The capacitive measuring device 1 includes a probe unit 2, which protrudes inwardly into the container 16. In the shown embodiment, the probe unit 2 includes a probe electrode 14 and an insulation 15, which completely surrounds the probe electrode 14 and isolates it electrically from the liquid medium 17. The wall of the container 16 forms the counter electrode for probe electrode 14. It is, however, equally possible to introduce a second probe with a reference electrode into the container 16. With such a probe unit 14, the fill level of the medium 4 is continuously determinable. The invention can, however, also be used in the case of apparatuses for capacitive registering of a limit level, wherein the apparatus is mounted at a certain height and especially flushly into the wall of the container 16. In an embodiment, the probe unit 2 can also have a guard electrode, which coaxially surrounds the probe electrode 14 at least in a region neighboring the process connection and which is likewise surrounded by insulation. Variables also determinable with the capacitive measuring device 1 of the invention include, for example, the electrical conductivity and/or the permittivity of the medium 17. Also, an accretion formation on the probe unit 2 can be detected.

The electronics unit 3 arranged in the shown case outside of the container 16 supplies the probe electrode 14 with an electrical signal in the form an alternating voltage and receives an electrical response signal from the probe electrode 14. The response signal is, as a rule, an electrical current signal, which is converted via a resistor into a corresponding voltage signal. This is preferably fed to the analog/digital converter of a microcontroller (not shown) in the electronics unit 3. In case a guard electrode is present, this receives the same transmission signal as the probe electrode 14. The characteristic variables of the response signal, such as, for example, the phase shift relative to the transmission signal or the amplitude, depend, among other things, on which part of the probe unit 14 is surrounded by the medium 17, so that the fill level of the medium 17 is continuously determinable and monitorable from the response signal. Another dependence results from the electrical conductivity and from the dielectric constant, respectively permittivity, of the medium. For the case, in which the medium 17 is non-conductive, no insulation is required, and the capacitance between probe electrode 14 and container 16 with the medium 17 as dielectric is measured. For the case, in which the medium 17 has at least a low conductivity, additionally the capacitance between probe electrode 14 and medium 17 is measured, wherein the insulation 15 serves as dielectric of the capacitor formed of probe electrode 14 and medium 17. In the case of high conductivity, only the insulation capacitance is measured. In this case, the measuring is independent of the value the dielectric constant of the medium 17.

Figure 2:
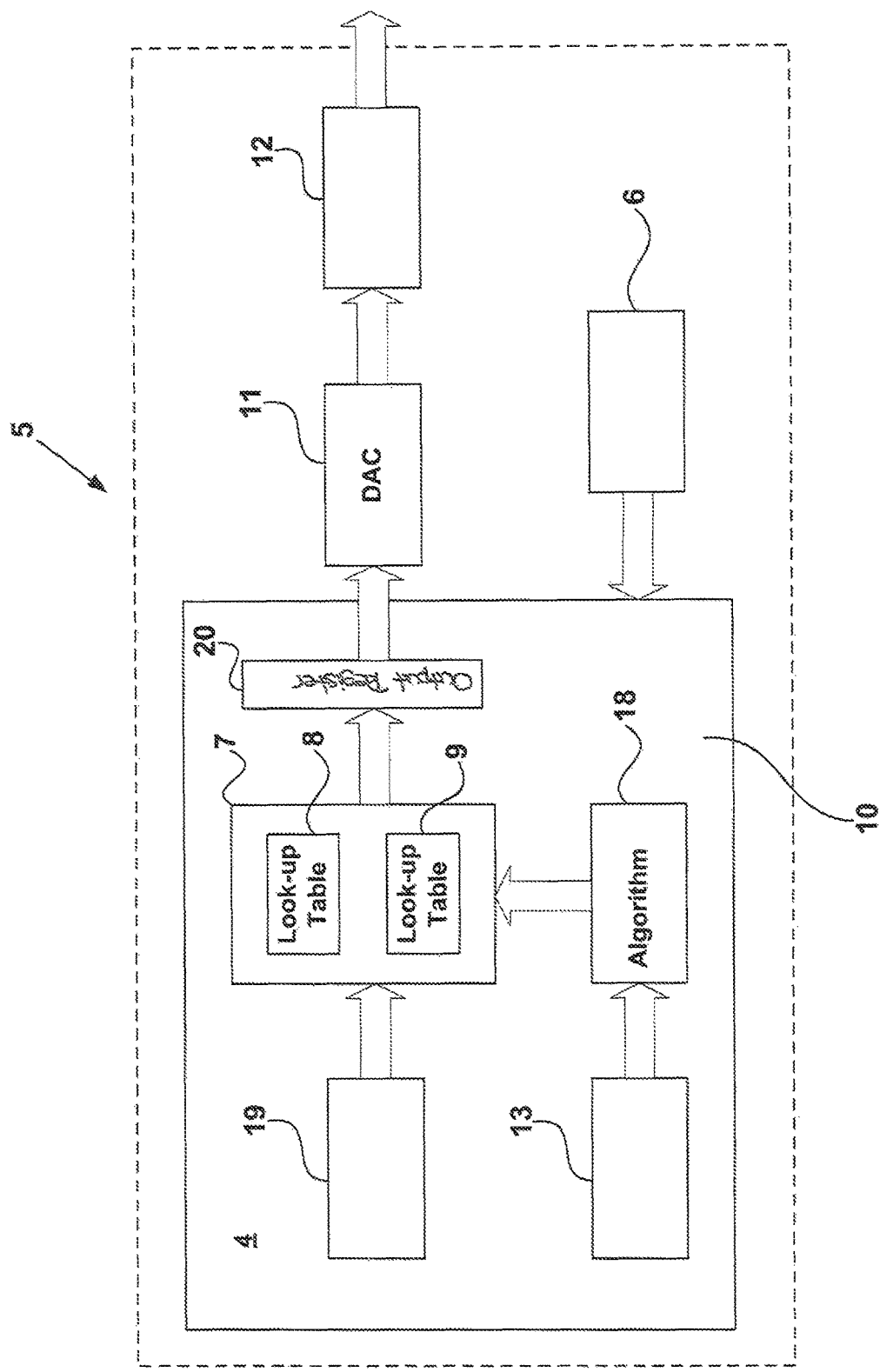
FIG. 2 is a block diagram of the signal chain of the individual components of an advantageous embodiment of the signal generator of the invention.

FIG. 2 shows a block diagram of the construction of a preferred variant of the signal generator 5 of the invention. Signal generator 5 is composed of a control- and/or computing unit 4, the digital-analog converter (DAC) 11 and a static filter unit 12. Preferably, the control- and/or computing unit is implemented in an FPGA 10. The control- and/or computing unit 4 can also undertake other tasks, e.g. concerning signal evaluation, and also is composed of a number of components, which perform the various tasks.

The control- and/or computing unit 4 is composed, in principle, of two portions: The components, which produce the at least one search table 8; 9—in the illustrated case, two search tables 8, 9 are used—in the memory unit 7, and the components, which are responsible for the signal output.

For the producing the search tables 8, 9 in the memory unit 7, a computing algorithm 18 is used. Additionally, the computing algorithm 18 interacts with the registers 13, which contain the information needed for calculating the amplitude values of the periodic signal to be produced. Registers 13 are modified by the control/computing unit 4, depending on required frequency and amplitude.

Production of the signal is performed by the address counter 19, the memory unit 7 and the DAC 11. The address counter counts through the addresses used in the corresponding search table(s) 8, 9 and the stored data are then output by the digital-analog converter 11.

The signal generator 4 supplies the probe unit 14 of a capacitive measuring device 1 with a plurality of different, discrete frequencies, in order to improve the performance of the capacitive measuring as regards accretion behavior, probe length and/or properties of the medium. The same holds for a vibronic measuring device. Reference is made in this connection to the above cited WO 2010/0139 508 A1.

According to the invention, a static filter unit 12 is applied for signal production. This is very cost effective compared with application of a dynamically adaptable signal filter.

The memory unit 7 of the embodiment of the signal generator 5 shown in FIG. 2 includes in the illustrated case two search tables 8, 9. This enables a calculating and storing of the sampling points for a first signal frequency in parallel with outputting a second, subsequent signal frequency. In this way, the delay time between the output of two signal frequencies can be minimized.

The invention claimed is:

1. Measuring apparatus for automation technology with a signal generator for producing periodic signals, wherein the signals have sequential, discrete signal frequencies, which lie within a predetermined frequency range, the signal generator comprising:
a control- and/or computing unit;
a clock signal producer;
a memory unit; and
a static filter unit, wherein:

said clock signal producer provides a constant sampling frequency, which is greater than the maximum discrete signal frequency in the predetermined frequency range;

in said memory unit for each of the discrete signal frequencies the amplitude values of the corresponding periodic signals are stored or storable as a function of the sampling frequency;

said control- and/or computing unit reads out the stored or storable amplitude values of the discrete signal frequencies successively with the sampling frequency of the clock from the memory unit and produces the periodic signals or forwards for producing;

said static filter unit has a limit frequency, which lies above the maximum signal frequency and which removes frequency fractions caused by the sampling;

in said memory unit for each of the discrete signal frequencies the amplitude values of the corresponding periodic signal are stored or storable as a function of the sampling frequency in the form of at least one search table, a so-called lookup table (LUT); and the control- and/or computing unit dynamically produces with assistance an algorithm, a look-up table for each of the discrete signal frequencies.

2. The measuring apparatus as claimed in claim 1, wherein:
said memory unit uses an integer delta implementation, in the case of which the amplitude values of each periodic signal for one period are stored at equidistant intervals.

3. The measuring apparatus as claimed in claim 1, wherein:
said algorithm is preferably an iterative or a recursive algorithm.

4. The measuring apparatus as claimed in claim 1, wherein:
at least two search tables are provided, via the first search table the output of a first discrete signal frequency occurs, while in the second search table the calculating and storing of the sampling points for a second discrete signal frequency occur in parallel.

5. The measuring apparatus as claimed in claim 1, wherein:
the frequency range lies preferably between 50 kHz and 5 MHz.

6. The measuring apparatus as claimed in claim 1, wherein:
the sampling frequency lies preferably at 20 MHz.

7. The measuring apparatus as claimed in claim 1, wherein:
said control/computing unit varies or sets the amplitude values of the periodic output signal produced by said signal generator by adapting the algorithm; and/or
said control unit- and/or said computing unit varies or sets the stored amplitude values in their size by a binary shifting operation of an output register.

8. The measuring apparatus as claimed in claim 1, wherein:
said control- and/or computing unit corrects the amplitude values of the periodic output signal produced by said signal generator in such a manner that amplitude changes as a result of a frequency dependent attenuation are at least approximately compensated by said static filter unit or by other disturbance effects.

9. The measuring apparatus as claimed in claim 1, wherein the measuring apparatus is an apparatus for capacitive determining and/or monitoring of fill level or limit level of a medium in a container, comprising:
a probe unit having at least one probe electrode; and
an electronics unit, which supplies said at least one probe electrode with an electrical measurement signal and receives and evaluates an electrical response signal from said probe unit, wherein:
said electronics unit supplies said at least one probe electrode at least at times with a measurement signal, which has a number of sequential, discrete signal frequencies lying within a predeterminable frequency range;
the signal generator produces the discrete signal frequencies, and the signal generator is associated with said electronics unit;
said electronics unit ascertains based on the sequential, discrete signal frequencies a signal frequency optimal for current application parameters; and
said electronics unit determines based on the response signal belonging to the optimal signal frequency the fill level or the limit-level of the medium in the container or another physical process variable.

10. The measuring apparatus as claimed in claim 9, wherein:
said electronics unit is implemented at least partially in an FPGA.

11. The measuring apparatus as claimed in claim 1, wherein:
components for producing said at least one search table are implemented in the FPGA.

12. The measuring apparatus as claimed in claim 1, wherein the measuring apparatus is a vibronic apparatus for determining or monitoring a predetermined fill level, a phase boundary or density of a medium in a container, comprising:
an oscillatable unit, said oscillatable unit is placed at the height of the predetermined fill level; and
a control- and/or computing unit, which excites the oscillatable unit by means of a frequency sweep within a predeterminable frequency range in the working range of said oscillatable unit successively with sequential, discrete signal frequencies to execute oscillations, wherein:
the signal generator performs the frequency sweep and a transmitting/receiving unit receives the corresponding oscillations of said oscillatable unit in the form of received signals;
the control and/or computing unit ascertains via the frequency sweep that signal frequency, in the case of which said oscillatable unit oscillates with an oscillation frequency, which has a predetermined phase shift between the transmission signal and the received signal; and
the transmitting/receiving unit excites the oscillatable unit with the ascertained signal frequency to execute oscillations or wherein the control and/or computing unit starts the following frequency sweep.

* * * * *